UNITED STATES PATENT OFFICE 2,630,427

PREPARATION OF STRONGLY BASIC ANION-EXCHANGE RESINS

Jesse C. H. Hwa, Philadelphia, Pa., assignor to Rohm & Haas Company, Philadelphia, Pa., a corporation of Delaware No Drawing. Application October 5, 1951, Serial No. 250,037

12 Claims. (Cl. 260—86.7)

This invention relates to anion-exchange resins and to their preparation. It relates to insoluble anion-exchange resins which are strongly basic and which contain quaternary ammonium hydroxide groups or quaternary ammonium salt groups. It also relates to the process by which these strongly basic anion-exchange resins are prepared.

The products of this invention are made by reacting, in aqueous medium, a tertiary amine with an insoluble, cross-linked polymer of a glycidyl ester of acrylic acid or of an alpha-substituted acrylic acid such as alpha-methacrylic acid. Reaction takes place between the oxirane oxygen atom of the glycidyl ester and the nitrogen atom of the tertiary amine in the presence of water.

The process can be better understood from a consideration of a preferred embodiment of this invention; namely, the preparation of a quaternary ammonium anion-exchange resin by the reaction in aqueous medium of trimethylamine and a cross-linked polymer of glycidyl methacrylate:

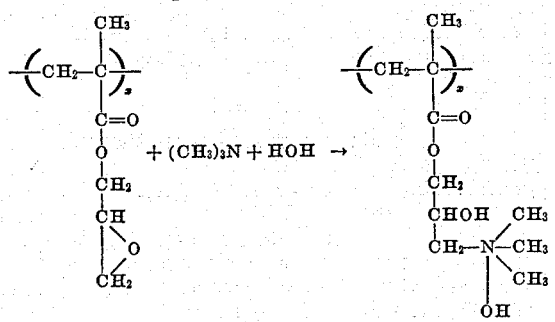

The character $x$ is employed in the conventional way to indicate that the structural unit shown is only one of many such units joined together in the polymeric glycidyl ester.

The scope of the invention is indicated by the following representation:

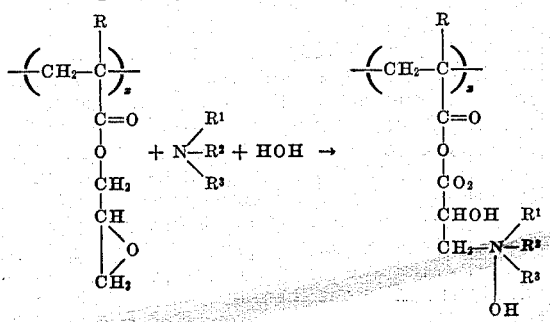

In the above, R represents an atom of hydrogen or an atom of chlorine or an alkyl group of one to four carbon atoms; and $NR_1R_2R_3$ represents a tertiary amine, preferably one in which the R— groups are hydrocarbon groups such as alkyl groups or are substituted hydrocarbon groups such as hydroxy aliphatic hydrocarbon groups.

It is to be noted that the oxirane rings of the polymeric glycidyl ester open during the reaction but that the rest of the macromolecule, including the group R, remains inert and intact. In like manner the groups on the tertiary amino nitrogen atom are not altered; and all that is required of the amine is that it be a tertiary amine, in which case quaternary ammonium groups become attached to the insoluble macromolecules. And as a consequence, the product has the properties of a strongly basic anion-exchange resin.

The monomeric glycidyl esters which are polymerized, cross-linked, and then reacted with a tertiary amine and water to produce the anion-exchange resins of this invention include the glycidyl esters of acrylic acid, alpha-chloroacrylic acid, alpha-methylacrylic acid, alpha-ethylacrylic acid, the isomeric alpha-propylacrylic acids and the isomeric alpha-butylacrylic acids. These monomeric esters are known and are ordinarily prepared by reacting a salt of the acid with epichlorohydrin, for example according to the method of U. S. Patent No. 2,537,981 of January 16, 1951.

The glycidyl esters are polymerized together with a cross-linking agent so as to produce insoluble polymeric products. Cross-linking agents are well known and embrace those compounds which are copolymerizable with the glycidyl esters and which contain a plurality of non-conjugated vinylidene groups, $CH_2=C<$. Currently, divinylbenzene is the most common cross-linking agent but others which are operable include diallyl esters of polycarboxylic acids, e. g., diallyl phthalate, diallyl succinate, and diallyl maleate; vinyl esters of polycarboxylic acids, e. g., divinyl sebacate; and polyvinyl hydrocarbons such as divinylnaphthalene, trivinylbenzene, trivinylnaphthalene, and polyvinylanthracenes.

By varying the amount of the cross-linking agent used in the preparation of the copolymer, variations can be made in the physical properties of the polymeric material which carry through to the finished product. Thus, for example, higher amounts of cross-linker make for products of higher density. In general the amount of copolymerizable cross-linking agent can vary from 0.1% to 40% of the total polymerizable materials on a molar basis. In practice, however, it is preferred to use at least 0.5%; and for most purposes no benefit is derived from using over about 10%.

The polymeric base material can be formed by any of the known polymerization processes such as polymerization in mass, in solvents for the monomeric materials or in emulsion or suspension in a liquid which is not a solvent for the monomers. The last is the preferred method because it produces the polymer in the form of small spheroids or beads, the size of which can be regulated and controlled.

The polymerization of the glycidyl ester and the copolymerizable cross-linking agent is accelerated by means of well known catalysts. These catalysts include ozone; ozonides; organic peroxidic compounds such as acetyl peroxide, lauroyl peroxide, stearoyl peroxide, tert.-butyl hydroperoxide, benzoyl peroxide, tert.-butylperbenzoate, di-tert.-butyl diperphthalate, di-tert.-butyl peroxide, and the barium salt of tert.-butyl hydroperoxide; inorganic agents such as barium peroxide, sodium peroxide, hydrogen peroxide; and the so-called "per salts" such as the water-soluble perborates, persulfates, and perchlorates. The catalysts are employed in suitable amounts ranging from 0.1% to about 2.0% based on the weight of the monomeric material to be polymerized.

Tertiary amines which react with the cross-linked and insoluble glycidyl esters are best represented, as above, by the general formula

in which $R^1$, $R^2$, and $R^3$ represent organic radicals. Those amines are preferred in which the organic groups attached to the nitrogen atoms are unsubstituted hydrocarbon groups. But it is also true that other amines can be used wherein the hydrocarbon radical of the amine carries a substituent group, such as a hydroxyl group, as in N,N-dimethylethanolamine, or another amino nitrogen atom as in tetramethyldiaminoethane. The portions of the tertiary amines which are represented by $R^1$, $R^2$, and $R^3$ above can be aliphatic, aromatic, cycloaliphatic, araliphatic, and alkaromatic. These groups are not altered during the reaction of the amine with the polymeric glycidyl ester. The stability on long continued use of the final, insoluble, quaternary ammonium resin in actual commercial use is somewhat dependent upon the particular radicals which are present in the reacted tertary amine and which are therefore, present in the final product. The most stable products are those in which the substituents on the nitrogen atom are methyl, benzyl, and phenyl groups. The beta-hydroxyethyl group is also a much preferred group. The most satisfactory tertiary amines which are employed, therefore, are typified by the following: Trimethylamine, dimethylbenzylamine, dibenzylmethylamine, dimethylaniline, benzylphenylmethylamine, N,N-dimethylethanolamine, N-methyldiethanolamine, and triethanolamine.

The amine is preferably employed in the form of the free base, in which case the product contains quaternary ammonium hydroxide groups. It can also be used, however, in the form of an amine salt, in which case the product contains the corresponding quaternary ammonium salt groups. It is not really important whether the product is isolated in the hydroxyl form or in the salt form because either form can be readily converted into the other. Thus, the hydroxyl form is changed to the salt form by treatment with a solution of an acid or a salt; or the salt form is converted to the hydroxyl form by treatment with a solution of a strong base. In fact, it is these same reversible reactions which take place during the ultimate use of the products as anion-exchangers.

The reaction of the tertiary amine and the polymeric glycidyl ester is carried in an aqueous medium. Particles of the insoluble resin are suspended and agitated in the mixture of tertiary amine and water and are reacted at a temperature from about −5° C. to the refluxing temperature of the reaction mixture. Since the process is less efficient at both ends of the given temperature range, it is much preferred to employ a temperature from about 20° C. to about 60° C. The addition of a tertiary amine salt or a quaternary ammonium salt as catalyst is recommended. For example, 1%, based on the resin, of trimethylamine hydrochloride is satisfactory. The course of the reaction can be readily followed by removing a portion of the resin, placing it in a column— which can be a burette or pipette—washing it with water, pouring a dilute solution of sodium chloride through the column slowly, and titrating with standard hydrochloric acid the amount of sodium hydroxide which is in the effluent and which is generated by the exchange of hydroxyl ions of the newly formed quaternary ammonium groups on the resin for chloride ions in the solution of sodium chloride.

When the reaction is complete, the resinous product containing quaternary ammonium groups is separated from the reaction mixture by decantation or filtration, for example, and is washed free of contaminants.

The following examples serve to illustrate the process of this invention which in its broader aspects is a method of converting insoluble, cross-linked polymers of glycidyl esters of acrylic and alpha-substituted acrylic acids into strongly basic anion-exchange resins, containing as polar, anion-adsorbing groups quaternary ammonium hydroxide or quaternary ammonium salt groups.

Example 1

Into a container equipped with thermometer, mechanical stirrer and reflux condenser were poured 1950 parts of water containing 0.5% of a commercial dispersing agent. To this stirred solution was added a mixture of 620 parts (0.44 mole) of monomeric glycidyl methacrylate, 20 parts of divinylbenzene, 13 parts of ethylstyrene, and 6.5 parts of benzoyl peroxide. The mixture was stirred for ten minutes at room temperature after which it was heated to 90° C. and held there for 1.5 hours. The mixture was then filtered and the hardened, insoluble beads of polymeric glycidyl methacrylate were washed thoroughly with water. The beads were uniform, individual, and hard and they had an average estimated size of 0.2 mm. diameter.

One hundred eighty-three parts of the resin particles were placed, while still wet with water, in a container equipped with thermometer, reflux condenser and agitator. Then 470 parts of a 25% aqueous solution of trimethylamine and 10 parts of 1 N hydrochloric acid were added. This mixture was stirred at room temperature for 2.5 days, after which the particles of resin were separated by filtration and were washed thoroughly with water. The product was an insoluble anion-exchange resin in the form of beads. It was also in the hydroxyl form. After being treated with an excess of dilute hydrochloric acid the resin in the salt form had an anion-exchange capacity of 0.92 milliequivalent per gram. In the hydroxyl form it had "the ability to split neutral salts" and, for example, to remove and adsorb chloride ions from a solution of sodium chloride.

*Example 2*

In this instance trimethylamine was employed in the form of the hydrochloride salt, and a resin containing quaternary ammonium chloride groups was prepared. The same equipment was used as in Example 1 above and the procedure was as follows: Into the container was poured 470 parts of a 25% aqueous solution of trimethylamine. To this was added 200 parts of concentrated (37%) hydrochloric acid, and the mixture was boiled until the vapors had a pH of 7. A thousand parts of water were added and then 183 parts of the insoluble particles of the polyglycidyl methacrylate prepared by the process of Example 1 were added. The resultant mixture was stirred at refluxing temperature for 12 hours, after which it was cooled and filtered. The particles of resin were then thoroughly washed with water. The product had an anion-exchange capacity of 2.95 milliequivalents per gram and was physically well suited for use in conventional ion-exchange column operation.

When tetramethyldiaminoethane,

was employed in an equivalent amount in place of the trimethylamine of Example 2, the product had a high exchange capacity but was denser than the product of Example 2. This increase in density was due to the additional cross-linkages in the resin resulting from the reaction of the epoxy groups in two units of the polymer with the two amino groups of the di-tertiary amine.

Thus, a cross-linked, insoluble product is also obtained, according to this invention, by reacting a linear thermoplastic polymer of a glycidyl ester of acrylic acid or an alpha-substituted acrylic acid with a poly-tertiary, preferably a di-tertiary, amine. In the reaction the tertiary amino groups in each molecule of amine react with the epoxy groups in the polymeric ester and form quaternary ammonium hydroxide groups while at the same time serving to cross-link the polymer and thereby convert it into an insoluble form.

I claim:

1. A process of preparing strongly basic anion-exchange resins containing polar quaternary ammonium groups which comprises reacting in aqueous medium a tertiary amine from the class consisting of trimethylamine, dimethylbenzylamine, dibenzylmethylamine, dimethylaniline, benzylphenylmethylamine, N,N-dimethylethanolamine, N-methyldiethanolamine, triethanolamine, and tetramethyldiaminoethane with an insoluble, cross-linked, resinous product which is a copolymer of a mixture containing (a) 90%–99.5% of a glycidyl ester having the general formula

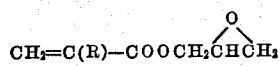

in which R represents a member of the class consisting of a hydrogen atom, a chlorine atom, and an alkyl group containing one to four carbon atoms, and (b) 0.5%–10% of a compound which is copolymerizable with said ester and which contains two to three non-conjugated vinylidene groups, $CH_2=C<$.

2. A process of preparing strongly basic anion-exchange resins containing polar quaternary ammonium groups which comprises reacting in aqueous medium trimethylamine with an insoluble, cross-linked, resinous product which is a copolymer of a mixture containing 90%–99.5% of glycidyl methacrylate and 0.5%–10% of divinylbenzene.

3. A process of preparing strongly basic anion-exchange resins containing polar quaternary ammonium groups which comprises reacting in aqueous medium dimethylaminoethanol with an insoluble, cross-linked, resinous product which is a copolymer of a mixture containing 90%–99.5% of glycidyl methacrylate and 0.5%–10% of divinylbenzene.

4. A process of preparing strongly basic anion-exchange resins containing polar quaternary ammonium groups which comprises reacting in aqueous medium tetramethyldiaminoethane with an insoluble, cross-linked, resinous product which is a copolymer of a mixture containing 90%–99.5% of glycidyl methacrylate and 0.5%–10% of divinylbenzene.

5. A process of preparing strongly basic anion-exchange resins containing polar quaternary ammonium groups which comprises reacting in aqueous medium trimethylamine with an insoluble, cross-linked, resinous product which is a copolymer of a mixture containing 90%–99.5% of glycidyl acrylate and 0.5%–10% of divinylbenzene.

6. A process of preparing strongly basic anion-exchange resins containing polar quaternary ammonium groups which comprises reacting in aqueous medium dimethylaminoethanol with an insoluble, cross-linked, resinous product which is a copolymer of a mixture containing 90%–99.5% of glycidyl acrylate and 0.5%–10% of divinylbenzene.

7. A strongly basic anion-exchange resin containing polar quaternary ammonium groups as prepared by the process of claim 1.

8. A strongly basic anion-exchange resin containing polar quaternary ammonium groups as prepared by the process of claim 2.

9. A strongly basic anion-exchange resin containing polar quaternary ammonium groups as prepared by the process of claim 3.

10. A strongly basic anion-exchange resin containing polar quaternary ammonium groups as prepared by the process of claim 4.

11. A strongly basic anion-exchange resin containing polar quaternary ammonium groups as prepared by the process of claim 5.

12. A strongly basic anion-exchange resin containing polar quaternary ammonium groups as prepared by the process of claim 6.

JESSE C. H. HWA.

REFERENCES CITED

The following references are of record in the file of this patent:

UNITED STATES PATENTS

| Number | Name | Date |
| --- | --- | --- |
| 2,580,901 | Erickson | Jan. 1, 1952 |
| 2,606,810 | Erickson | Aug. 12, 1952 |